United States Patent
Arumugam et al.

(10) Patent No.: US 11,274,227 B1
(45) Date of Patent: Mar. 15, 2022

(54) OIL AND WATER RESISTANT LOW ADHESION SURFACE TREATMENT AND COATINGS

(71) Applicant: Oceanit Laboratories, Inc., Honolulu, HI (US)

(72) Inventors: Ganesh Kumar Arumugam, Honolulu, HI (US); Vinod P. Veedu, Houston, TX (US); Matthew Nakatsuka, Honolulu, HI (US)

(73) Assignee: Oceanit Laboratories, Inc., Honolulu, HI (US)

( * ) Notice: Subject to any disclaimer, the term of this patent is extended or adjusted under 35 U.S.C. 154(b) by 309 days.

(21) Appl. No.: 16/533,754

(22) Filed: Aug. 6, 2019

(51) Int. Cl.
| | |
|---|---|
| C09D 171/02 | (2006.01) |
| C08G 65/00 | (2006.01) |
| C08K 5/34 | (2006.01) |
| B05D 5/08 | (2006.01) |
| C09D 7/63 | (2018.01) |
| C09D 7/65 | (2018.01) |
| C08K 5/54 | (2006.01) |
| C08K 5/3445 | (2006.01) |
| C08K 5/5435 | (2006.01) |

(52) U.S. Cl.
CPC ........... *C09D 171/02* (2013.01); *B05D 5/083* (2013.01); *C08G 65/007* (2013.01); *C08K 5/3445* (2013.01); *C08K 5/5435* (2013.01); *C09D 7/63* (2018.01); *C09D 7/65* (2018.01)

(58) Field of Classification Search
CPC .......... C09D 171/02; C09D 7/63; C09D 7/65; C08G 65/007; C08K 5/3445; C08K 5/5435; B05D 5/083
USPC .......................................................... 524/544
See application file for complete search history.

(56) References Cited

U.S. PATENT DOCUMENTS

| | | | |
|---|---|---|---|
| 8,530,212 B2 * | 9/2013 | Moloney | D06M 13/288 |
| | | | 435/180 |
| 9,963,597 B2 * | 5/2018 | Aizenberg | C09D 201/005 |
| 2008/0015298 A1 * | 1/2008 | Xiong | C09D 127/18 |
| | | | 524/432 |
| 2019/0345358 A1 * | 11/2019 | De Coninck | C09D 7/67 |

* cited by examiner

*Primary Examiner* — Michael M. Bernshteyn
(74) *Attorney, Agent, or Firm* — Fresh IP PLC; Clifford D. Hyra; Aubrey Y. Chen

(57) ABSTRACT

A novel omniphobic surface coating is disclosed that provides both high oil-repellency and high-water repellency to the coated surface. The coating may contain perfluoropolyether (PFPE) or a similar fluorinated or perfluorinated polymer, as well as a hardener and a catalyst. One or more surfactants or viscosifiers may also be added. Further, the coating may contain one or more functional additives, including, but not limited to, coloring agents, anti-corrosive agents, anti-fouling agents, water-repellent agents, and/or oil-repellent agents. Methods for formulating the novel omniphobic surface coating are also described. Such methods include preparing a first part of the coating, which may contain, at minimum, a polymer such as PFPE or a similar fluorinated or perfluorinated polymer, and a suitable solvent; preparing a second part of the coating, which is a water-free system that may contain, at minimum, a hardener and a catalyst; and combining the first part and the second part together.

27 Claims, 1 Drawing Sheet

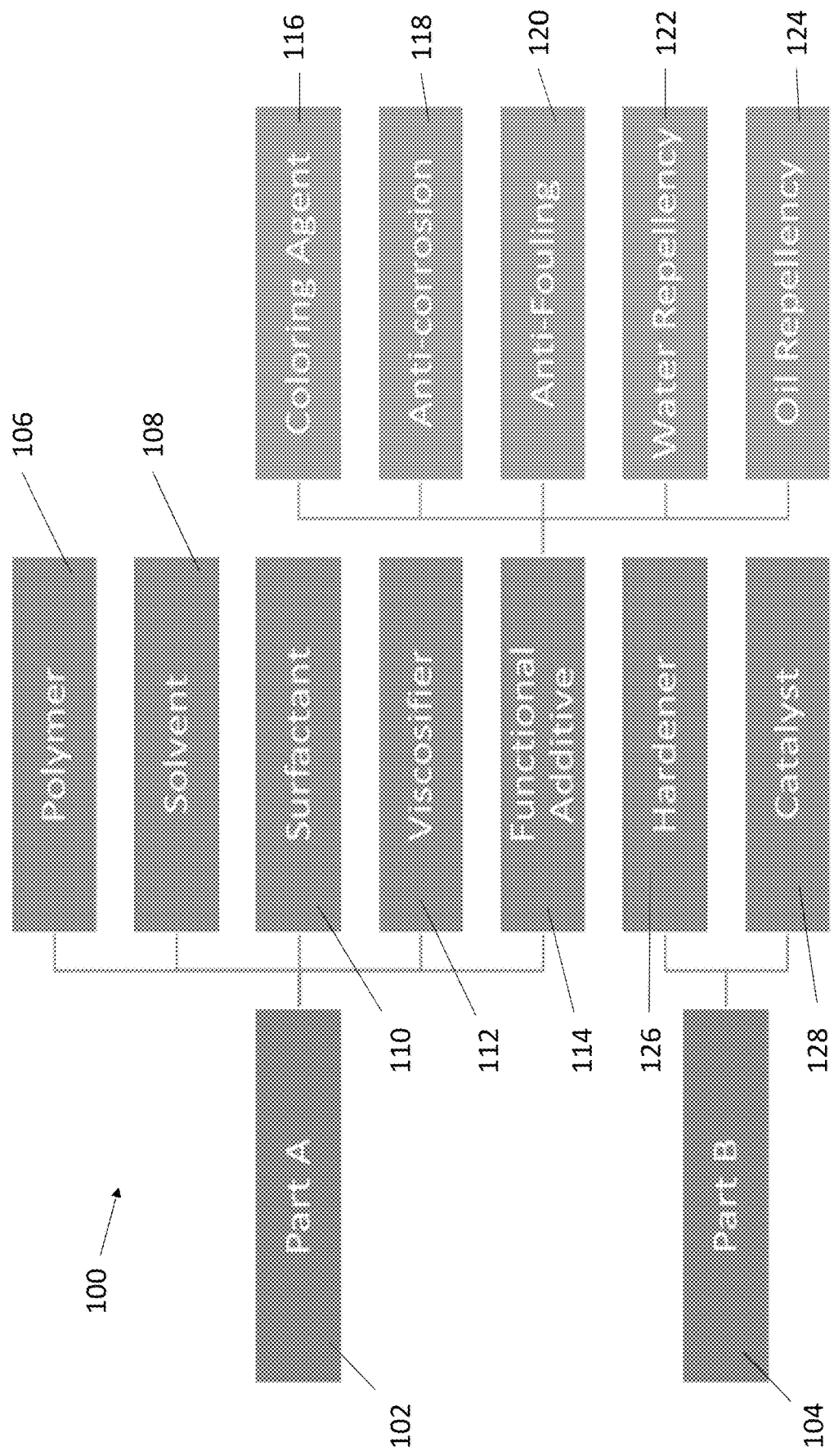

OIL AND WATER RESISTANT LOW ADHESION SURFACE TREATMENT AND COATINGS

The invention described herein was made with U.S. government ("Government") support under Contract No. DE-FE0031533, awarded by the U.S. Department of Energy. As a result, the Government has certain rights in this invention.

FIELD OF THE INVENTION

The application relates generally to omniphobic surface treatments and coatings based on perfluorinated compounds, including, but not limited to, perfluoropolyether (PFPE).

BACKGROUND

Coatings and coating materials are often used on surfaces, especially metal surfaces, to prevent corrosion and other damage to such surfaces. Purely as a non-limiting example, coatings are used on both the interior and the exterior of pipelines, such as pipelines used in oil and gas drilling and exploration operations. Surface coatings are therefore often exposed to challenging environments, including, for example, temperatures of 200-250° C. and pressures above 100 psi and up to 20000 psi.

Many commercially-available coatings and coating materials contain, and make plentiful use of, additives having particles of micron size (i.e., 1-100 microns) ("microscale additives") and nanometer size (i.e., less than 200 nm) ("nanoscale additives") to create surface roughness that promotes changes in wettability. Such commercially-available coatings and coating materials therefore often utilize microscale additives and/or nanoscale additives to create a coated surface with omniphobic, i.e., oil-repellent and water-repellent, properties. Such microscale and nanoscale additives often consist of microparticles, nanoparticles, and other chemical constructs and materials of both micrometer and nanometer size. Both microscale additives and nanoscale additives may leach out of coatings, resulting in contamination of any liquid or fluid in contact with the coated surface.

Needs therefore exist for effective, easy to apply surface treatments and coatings that are free from microscale and nanoscale additives.

SUMMARY

It is to be understood that both the following summary and the detailed description are exemplary and explanatory and are intended to provide further explanation of the invention as claimed. Neither the summary nor the description that follows is intended to define or limit the scope of the invention to the particular features mentioned in the summary or in the description. Rather, the scope of the invention is defined by the appended claims.

In certain embodiments, the disclosed embodiments may include one or more of the features described herein.

The invention in its various embodiments relates to a novel omniphobic surface treatment or coating that does not contain microscale and nanoscale additives, including, but not limited to, microparticles, nanoparticles, micrometer-scale compounds ("microscale compounds"), nanometer-scale compounds ("nanoscale compounds"), and the like. In some embodiments, this novel surface treatment or coating is based on perfluorinated compounds, in particular, perfluoropolyether (PFPE). The treatment or coating of various embodiments of the invention is capable of being applied to a metal or other surface, including surfaces located in industrial environments that may have high pressure surroundings (such as, for example, up to 15,000 psi) and/or high heat surroundings (such as, for example, up to 200° C.), at a thickness of as low as 0.25 mil ($\frac{1}{1000}$") or 6.35 micrometer and with a polymeric content of as low as 1% by weight.

In some embodiments, the novel omniphobic surface coating includes a water-soluble low weight-average molecular weight polymer dispersed as an anionic suspension in water, an aqueous or non-aqueous solvent, a hardener, and a catalyst. In some embodiments, this coating does not include microscale or nanoscale additives. The coating may also include a viscosifier and/or surfactant. The polymer may include perfluoropolyether (PFPE). The PFPE may exist as a percentage by weight of between 1% and 50%. The surfactant may exist as a percentage by weight of less than 1%. The polymer may be less than 5000 g/mol. The polymer may be either a fluorinated or perfluorinated compound. The coating may also include one or more functional additives. The one or more functional additives may be selected from the group consisting of a coloring agent, an anti-corrosive agent, an anti-fouling agent, a water-repellent agent, an oil-repellent agent, and combinations thereof. The hardener may be a silane-terminated epoxide. The catalyst may be an imidazole.

A novel method of formulating an omniphobic surface coating involves preparing a first part of an omniphobic surface coating, the first part comprising: a water-soluble low weight-average molecular weight polymer dispersed as an anionic suspension in water, and an aqueous or non-aqueous solvent; preparing a second part of the omniphobic surface coating, the second part being a water-free system comprising: a hardener, and a catalyst; and combining the first part and the second part to produce the omniphobic surface coating. The method may also involve adding a viscosifier and/or a surfactant to the first part. The polymer may include PFPE. The PFPE may exists as a percentage by weight of between 1% and 50%. The surfactant may exist as a percentage by weight of less than <2.0%. The polymer may be less than 5000 g/mol. The polymer may be either a fluorinated or perfluorinated compound. The hardener may be a silane-terminated epoxide. The catalyst may be an imidazole. The first part of the omniphobic surface coating may also include one or more functional additives. The one or more functional additives may be selected from the group consisting of a coloring agent, an anti-corrosive agent, an anti-fouling agent, a water-repellent agent, an oil-repellent agent, and combinations thereof.

Embodiments of the novel omniphobic surface treatment or coating further provide several advantages over commercially-available omniphobic surface coatings and other omniphobic surface compounds disclosed in the prior art. Indeed, although there is a strong need for low adhesion (i.e., low surface energy) coatings to combat issues such as corrosion, biofouling, hydrates, asphaltenes, and debris accumulation (such as wax buildup and sand debris), there is a severe inadequacy in commercially-available surface coating and treatment solutions. In particular, many commercially-available surface coatings and treatments do not perform well in extreme environmental conditions, such as high pressure, high temperature, multiphase media surroundings (including mixtures of oil, water, and/or gas), and the presence of various additives and chemicals in the fluid contacting the surface.

Additional advantages of the novel omniphobic coating according to one or more embodiments of the instant invention include the use of PFPE in a standalone coating solution. The use of perfluorinated compounds, such as PFPE, has gained significant interest over the past few years mainly due to the ability of such compounds to resist various water- and oil-based solvents. However, due to the chemical nature of PFPE, it is not currently used as a standalone coating and is only used as an additive in existing epoxy, acrylic, and urethane coating technologies. Many of these existing omniphobic coating technologies that rely on PFPE use PFPE as a liquid to fill and/or coat various nanostructures that are present in the coating and that are responsible for creating a low surface energy, resulting in oil- and water-repellency.

Thus, there is currently no commercially available omniphobic coating that is based on PFPE but also does not include microscale or nanoscale additives. Embodiments of the novel omniphobic coating disclosed herein are the first PFPE-based coatings without microscale or nanoscale additives. This coating is superior over the prior art since it provides (1) a low surface energy to achieve both water- and oil-repellency, (2) easy application to a variety of surfaces of different materials, types, and geometries, and (3) effectiveness at an extremely low thickness. The novel omniphobic coating is therefore more effective and desirable for use in industrial environments than products such as polytetrafluoroethylene (PTFE, also known in some formulations by the brand name Teflon®), other existing perfluorinated coatings, epoxy, polyurethane, vinyl esters, and the like.

Embodiments of the novel omniphobic coatings are also highly desirable for marine/aquatic environments, since they do not leach micro- or nanoscale additives into water that is in contact with the coatings. Leaching of mico- and nanoscale additives into a marine environment can cause environmental contamination, as such additives often have some level of toxicity. Embodiments of the present invention are completely non-toxic and have no contamination issues.

Additionally, embodiments of the novel omniphobic coatings described herein may be used in conjunction with one or more of the multi-functional, corrosion-resistant coatings described in U.S. Ser. No. 14/957,512 to the same assignee, filed Dec. 2, 2015, which is hereby incorporated by reference in its entirety. In particular, embodiments of the novel omniphobic coatings described herein may be used as the multifunctional oil/water repellant top layer (e.g. above the corrosion resistant alloy coating layer and surface modification/functionalization) of the multi-functional, corrosion-resistant coatings described in U.S. Ser. No. 14/957,512, or as one or more layers on top of such multi-functional coatings.

BRIEF DESCRIPTION OF THE DRAWINGS

The accompanying drawings, which are incorporated herein and form a part of the specification, illustrate exemplary embodiments and, together with the description, further serve to enable a person skilled in the pertinent art to make and use these embodiments and others that will be apparent to those skilled in the art.

FIG. 1 is a schematic illustrating the various possible components of a novel omniphobic surface treatment or coating, according to one or more embodiments of the instant invention.

DETAILED DESCRIPTION

Novel omniphobic surface coatings and treatments will be disclosed herein in terms of various exemplary embodiments. This specification discloses one or more embodiments that incorporate features of the invention. The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. When a particular feature, structure, or characteristic is described in connection with an embodiment, persons skilled in the art may effect such feature, structure, or characteristic in connection with other embodiments whether or not explicitly described.

In the several figures, like reference numerals may be used for like elements having like functions even in different drawings. The figures are not to scale. The embodiments described, and their detailed construction and elements, are merely provided to assist in a comprehensive understanding of the invention. Thus, it is apparent that the present invention can be carried out in a variety of ways, and does not require any of the specific features described herein. Also, well-known functions or constructions are not described in detail since they would obscure the invention with unnecessary detail. Any signal arrows in the drawings/figures should be considered only as exemplary, and not limiting, unless otherwise specifically noted.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an" and "the" are intended to include the plural forms as well, unless the context clearly indicates otherwise.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

As used herein, ranges are used herein in shorthand, so as to avoid having to list and describe each and every value within the range. Any appropriate value within the range can be selected, where appropriate, as the upper value, lower value, or the terminus of the range.

The words "comprise", "comprises", and "comprising" are to be interpreted inclusively rather than exclusively. Likewise, the terms "include", "including" and "or" should all be construed to be inclusive, unless such a construction is clearly prohibited from the context. The terms "comprising" or "including" are intended to include embodiments encompassed by the terms "consisting essentially of" and "consisting of". Similarly, the term "consisting essentially of" is intended to include embodiments encompassed by the term "consisting of". Although having distinct meanings, the terms "comprising", "having", "containing" and "consisting of" may be replaced with one another throughout the description of the invention.

Wherever the phrase "for example," "such as," "including" and the like are used herein, the phrase "and without limitation" is understood to follow unless explicitly stated otherwise.

FIG. 1 is a schematic illustrating the various possible components of a novel omniphobic surface treatment or coating, according to one or more embodiments of the instant invention. The coating is a PFPE-based, standalone coating that has excellent adhesion to a variety of substrate surfaces, including, but not limited to, metallic surfaces, composite surfaces, ceramic surfaces, and surfaces containing one or more polymers. The coating may, for example, provide excellent adhesion by exhibiting strong bonding characteristics with the surface or substrate to be coated, even in the absence of any surface preparation or primer. Such excellent adhesion/strong binding characteristics may be demonstrated by a lack of any signs of delamination or debonding of the coating when standard adhesion tests are conducted. The coating further provides coated surfaces with both high water repellency and high oil repellency. High water repellency means, for example, that the coating has a contact angle measurement of greater than 100° for water. High oil repellency means, for example, that the coating has a contact angle measurement of greater than 50° for oil. Further, the coating is effective in preventing corrosion and/or fouling resistance in as thin a layer as 0.25 mil (¹/₁₀₀₀") or 6.35 micrometer, and at a polymeric content of 1% by weight. The coating may therefore be deemed effective if it exhibits both high water repellency and high oil repellency, as defined above, and/or protects the coated surface against any signs of rust or corrosion after several hundred hours, or more, in an accelerated corrosion testing chamber, and/or reduces biofouling growth on the coated surface by at least 25-50% or more in comparison to an uncoated surface as shown by, for example, a saltwater immersion test. Additionally, the coating need not contain any microscale additives or any nanoscale additives, including, but not limited to, microparticles or nanoparticles.

The overall omniphobic coating 100 comprises two constituent parts, Part A 102 and Part B 104. Part A generally comprises a water-soluble low weight-average molecular weight polymer 106, such as PFPE; a solvent 108; a surfactant 110; and a viscosifier 112. Part A may further comprise one or more functional additives 114, which comprise a coloring agent 116; an anti-corrosion agent 118; an anti-fouling agent 120; a water repellent additive 122; and/or an oil repellent additive 124.

The water-soluble low weight-average molecular weight polymer 106, such as, for example, PFPE, is dispersed as an anionic suspension in water. The weight of the polymer content may be varied from between 1% by weight to 50% by weight. It should be appreciated that perfluorinated or fluorinated compounds, other than PFPE, that have a low weight-average molecular weight (less than 5000 g/mol) may be used as the polymer 106.

A surfactant 110 may be a commercially-available surfactant such as, for example, octylphenol ethoxylate (commonly referred to by the brand name Triton X-100®), polysorbate 20 (commonly referred to by the brand name Tween-20), or cetrimonium bromide (CTAB). The surfactant may be added at concentrations ~0.0001-2.0% by weight to help with uniform dispersion and wettability of the overall omniphobic coating 100.

The density and viscosity of Part A may also be modified via the addition of a viscosifier 112, which may be a commercially-available viscosifier such as, for example, ACRYSOL® or any commercially-available water-based viscosifying polymer.

Part A may be formulated in a solvent 108 that is either aqueous or non-aqueous.

Part A may further comprise one or more functional additives 114, such as, for example, a coloring agent 116; an anti-corrosion agent 118; an anti-fouling agent 120; a water repellent additive 122; and/or an oil repellent additive 124. Any such additives need not contain either microscale additives or nanoscale additives.

The coloring agent 116 may be added to improve or change the desired color of the overall coating 100, for example to match an existing coating. In the absence of a coloring agent, the coating may be transparent, which may be desirable for viewing corrosion occurring under the coating. Suitable coloring agents will be known to one of skill in the art. Similarly, one of skill in the art will be aware of suitable anti-corrosion agents 118, anti-fouling agents 120, water-repellent additives 122, and oil-repellent additives 124. It should be appreciated that a variety of chemicals and additives may be added to Part A that either directly react to the polymer 106 or are inert with respect to the polymer 106.

Purely as a non-limiting example, a water-repellent additive 122 could comprise a monomer or polymer that has similarly high water-repellency (>100° contact angle) characteristics, used in less than 25% of the overall coating 100 by weight. Such moieties could include, for example, fluoroalkyl silanes, perfluorinated monomers, perfluoro poly ether diol, perfluoro poly ether carboxylic acids, and the like. Similarly, and again as a non-limiting example, an oil-repellent additive 124 could comprise a monomer or polymer that has similarly high oil-repellency (>50° contact angle) characteristics, used in less than 25% of the overall coating 100 by weight. Such moieties could include, for example, epifluorohydrin, fluorinated acrylates, fluorinated poly oligomeric silesquioxane (POSS), fluorinated urethane, and the like.

Part B generally comprises a water-free system with a hardener 126 and a catalyst 128, which are capable of chemically reacting with each other. The catalyst 128 is also capable of reacting with one or more components in Part A, and further promoting curing of the polymer 106 in Part A. A bifunctional linker may be used as the hardener 126, such as, for example, commercially-available silane terminated epoxides ((3-Glycidoxypropyl)trimethoxysilane)/2-(3,4-epoxycyclohexyl)ethyltrimethoxysilane), which are capable of reacting with amine groups and undergoing hydrolysis. The catalyst 128 may be, for example, an imidazole, such as 2-Ethyl-4-methylimidazole, that can crosslink with the epoxide or other material used as the hardener 126. Imidazoles may also be used due to their ability to react with one or more components in Part A (i.e., the anionic component of the coating 100).

In certain embodiments of the invention, the components of Part A described herein are added to, and mixed together, separately from the components of Part B. With respect to Part A, the water-soluble low weight-average molecular weight polymer 106; the solvent 108; the surfactant 110; the viscosifier 112; and any additional functional additives 114 are mixed together and stored in one or more containers. With respect to Part B, the hardener 126 and the catalyst 128 are mixed together and stored in one or more containers different from the one or more containers used to store Part A. The overall coating 100 is then made before application by combining Part A and Part B. It should be appreciated that methods of mixing and combining the various components of both Part A and Part B are well-known to one of skill in the art.

The novel omniphobic coatings described herein, of which coating 100 is an exemplary embodiment, are therefore an improvement over current oleophobic, hydrophobic, and omniphobic coating technologies. Such current coatings require significant surface preparation, including the building of unique microstructures and/or nanostructures. The coatings that are embodiments of the instant invention are further advantageous over currently available coating solutions because they are scalable for commercial applications and operations.

Additionally, the coatings described herein may be applied in a thin layer, such as, for example, a layer as thin as 0.25 mil (1/1000") or 6.34 micrometer, or thicker. Many currently-existing coatings, including oil- and water-repellent coatings, are mainly composed of various polymeric resins that are applied as an extremely thick coating (greater than 6 mil). Such thick coatings may cause issues in industrial applications and are also costly to apply.

It should be appreciated, therefore, that the coating in its various embodiments is a thin, easy to apply, low surface energy coating that is suitable for heavy-duty industrial and commercial applications, and may easily scaled up for large-scale production.

These and other objectives and features of the invention are apparent in the disclosure, which includes the above and ongoing written specification.

The invention is not limited to the particular embodiments described above in detail. Those skilled in the art will recognize that other arrangements could be devised. The invention encompasses every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application. While the invention has been described with reference to specific illustrative embodiments, modifications and variations of the invention may be constructed without departing from the scope of the invention as set forth in the following claims.

We claim:

1. An omniphobic surface coating, comprising:
   a water-soluble low weight-average molecular weight polymer dispersed as an anionic suspension in water;
   an aqueous or non-aqueous solvent;
   a hardener; and
   a catalyst.
2. The coating of claim 1, further comprising a viscosifier.
3. The coating of claim 1, further comprising a surfactant.
4. The coating of claim 1, wherein the polymer comprises perfluoropolyether (PFPE).
5. The coating of claim 4, wherein the PFPE is between 1% and 50% by weight.
6. The coating of claim 1, wherein the surfactant is less than 2% by weight.
7. The coating of claim 1, wherein the polymer is less than 5000 g/mol.
8. The coating of claim 1, wherein the polymer is either a fluorinated or perfluorinated compound.
9. The coating of claim 1, further comprising:
   one or more functional additives.
10. The coating of claim 9, wherein the one or more functional additives is selected from the group consisting of a coloring agent, an anti-corrosive agent, an anti-fouling agent, a water-repellent agent, an oil-repellent agent, and combinations thereof.
11. The coating of claim 1, wherein the hardener is a silane-terminated epoxide.
12. The coating of claim 1, wherein the catalyst is an imidazole.
13. A method of formulating an omniphobic surface coating, comprising:
    preparing a first part of an omniphobic surface coating, the first part comprising:
       a water-soluble low weight-average molecular weight polymer dispersed as an anionic suspension in water, and
       an aqueous or non-aqueous solvent;
    preparing a second part of the omniphobic surface coating, the second part being a water-free system comprising:
       a hardener, and
       a catalyst; and
    combining the first part and the second part to produce the omniphobic surface coating.
14. The method of claim 13, further comprising:
    adding a viscosifier to the first part.
15. The method of claim 14, further comprising:
    adding a surfactant to the first part.
16. The method of claim 13, wherein the polymer comprises perfluoropolyether (PFPE).
17. The method of claim 16, wherein the PFPE is between 1% and 50% by weight.
18. The method of claim 13, wherein the surfactant is less than 2.0% by weight.
19. The method of claim 13, wherein the polymer is less than 5000 g/mol.
20. The method of claim 13, wherein the polymer is either a fluorinated or perfluorinated compound.
21. The method of claim 13, wherein the hardener is a silane-terminated epoxide.
22. The method of claim 13, wherein the catalyst is an imidazole.
23. The method of claim 13, wherein the first part of the omniphobic surface coating further comprises one or more functional additives.
24. The method of claim 23, wherein the one or more functional additives is selected from the group consisting of a coloring agent, an anti-corrosive agent, an anti-fouling agent, a water-repellent agent, an oil-repellent agent, and combinations thereof.
25. An omniphobic surface coating, comprising:
    a first constituent portion comprising:
       a water-soluble polymer dispersed as an anionic suspension in water,
       a solvent,
       a surfactant, and
       a water-based viscosifying polymer; and
    a second constituent portion comprising:
       a hardener, and
       a catalyst,
    wherein the second constituent portion is water-free, and
    wherein the hardener and the catalyst react with each other.
26. The omniphobic surface coating of claim 25, wherein the water-soluble polymer is perfluoropolyether (PFPE) wherein the surfactant is between 0.0001% and 2% by weight, wherein the hardener is a bifunctional linker, and wherein the catalyst is an imidazole.
27. The omniphobic surface coating of claim 25, wherein the catalyst reacts with one or more components of the first constituent portion, thereby resulting in additional curing of the water-soluble polymer.

* * * * *